(12) United States Patent
Lee (10) Patent No.: US 9,710,719 B2
(45) Date of Patent: Jul. 18, 2017

(54) APPARATUS AND METHOD FOR IMAGE RECOGNITION

(71) Applicant: Electronics & Telecommunications Research Institute, Daejeon (KR)

(72) Inventor: Jae Yeong Lee, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 296 days.

(21) Appl. No.: 14/503,291

(22) Filed: Sep. 30, 2014

(65) Prior Publication Data

US 2015/0092057 A1     Apr. 2, 2015

(30) Foreign Application Priority Data

Sep. 30, 2013    (KR) ........................ 10-2013-0116018

(51) Int. Cl.
| | |
|---|---|
| H04N 7/18 | (2006.01) |
| G06K 9/20 | (2006.01) |
| G06K 9/32 | (2006.01) |
| G06K 9/62 | (2006.01) |

(52) U.S. Cl.
CPC ......... *G06K 9/2018* (2013.01); *G06K 9/3241* (2013.01); *G06K 9/6253* (2013.01)

(58) Field of Classification Search
CPC ............. H04N 7/50; H04N 7/24; H04N 7/462
USPC ........................ 375/240.08–240.09; 348/135
See application file for complete search history.

(56) References Cited

U.S. PATENT DOCUMENTS

| | | | |
|---|---|---|---|
| 2008/0317357 A1* | 12/2008 | Steinberg | ................ G06T 5/005 382/209 |
| 2011/0044545 A1 | 2/2011 | Jessen et al. | |
| 2013/0083965 A1 | 4/2013 | Joung et al. | |
| 2014/0119609 A1 | 5/2014 | Lee et al. | |

FOREIGN PATENT DOCUMENTS

| | | |
|---|---|---|
| KR | 10-2004-0100963 | 12/2004 |
| KR | 10-2014-0056790 | 5/2014 |

OTHER PUBLICATIONS

Patrick Sudowe et al., "Efficient Use of Geometric Constraints for Sliding-Window Object Detection in Video", UMIC Research Centre, RWTH Aachen University, Germany, pp. 1-10.

* cited by examiner

*Primary Examiner* — Andy Rao
(74) *Attorney, Agent, or Firm* — Kile Park Reed & Houtteman PLLC (57) ABSTRACT

Disclosed are image recognition apparatuses and methods which detect subject objects by configuring effective candidate regions for the subject objects in a target image. The apparatus includes an image inputting part receiving at least one image; an effective candidate region configuring part configured to receive a user input including information on reference positions of effective candidate regions and an upper limit and a lower limit of the effective candidate regions, and to configure the effective candidate regions based on the user input; and an effective region determining part configured to select an effective region meeting a preconfigured threshold among the effective candidate regions configured based on the user input. Therefore, since a complex conventional camera calibration procedure is not necessary, time and cost can be saved.

20 Claims, 9 Drawing Sheets

APPARATUS AND METHOD FOR IMAGE RECOGNITION

CLAIM FOR PRIORITY

This application claims priority to Korean Patent Application No. 10-2013-0116018 filed on Sep. 30, 2013 in the Korean Intellectual Property Office (KIPO), the entire contents of which are hereby incorporated by references.

BACKGROUND

1. Technical Field

Example embodiments of the present invention relate to a technique of image recognition and more specifically to an image recognition apparatus and method for recognizing a subject object by configuring an effective region of the subject object in a target image.

2. Related Art

Recently, application domains of image recognition technologies and importance of them are increasing. For example, a black-box system which recognizes images by using a camera attached in a car and records them is being used as a safety device which can realize safe driving by detecting pedestrians and other cars around the car.

Generally, image recognition systems determine whether a subject object exists in an image by detecting all objects within the image. Such the method has a problem of high false detection probability and too much time required for detecting the subject object. In order to resolve such the problems, a detection method, which can detect the subject object accurately and rapidly by restricting a detection space within an image based on a geometrical relation between a camera and the ground, has been developed.

For example, in case of a fixed Closed Circuit Television (CCTV) camera attached in a building or a camera attached fixedly to a specific position of a vehicle, a robot, etc., their positions with reference to the ground usually do not change. In these cases, height, angles of pan and tilt, etc. of the camera may have geometrical relations with reference to the ground. Thus, an image recognition apparatus may exclude ineffective candidate regions from its detection space based on the geometrical relations before detecting a subject object.

Figure 1:
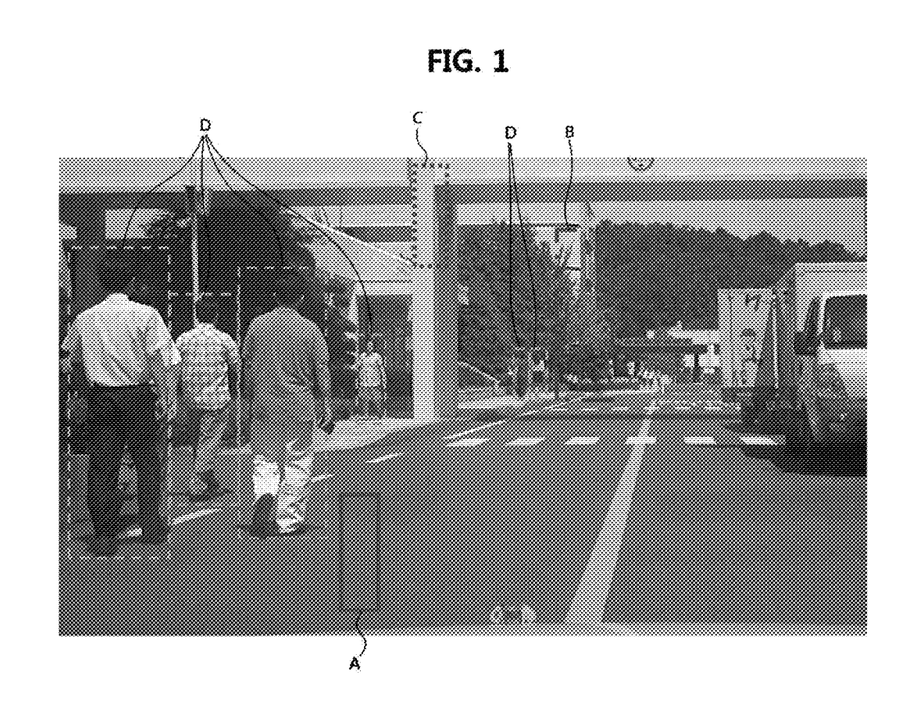
FIG. 1 is a conceptual diagram illustrating image recognition.

FIG. 1 is a conceptual diagram illustrating image recognition.

Referring to FIG. 1, when a black-box camera attached to a car is used to detect pedestrians, ineffective candidate regions may be a region A, a region B, a region C, and so on. For example, the region A may be a region which is located near the camera but has a too small area size, and the region B may be a region which is located far from the camera but has a too large area size, and the region C may be a region located in a sky where a pedestrian usually cannot exist.

Then, the image recognition apparatus may try to detect subject objects in only effective candidate regions (e.g. a region D) by excluding the ineffective candidate regions A, B, and C so that the time required for detecting subject objects and the false detection probability may be reduced remarkably.

Specifically, in order to determine effective candidate regions within an image, a conventional image recognition apparatus is configured to estimate equations for conversion between a physical space coordinate system and an image coordinate system through a camera calibration procedure, convert candidate regions on the image coordinate system into candidate regions on the physical space coordinate system based on the equations for conversion, and determine only candidate regions whose distance and size fall within normal ranges as the effective candidate regions.

As described above, since the conventional image recognition apparatus uses a method for restricting candidate regions by using the conversion equations, there is a problem that the camera calibration procedure for deriving the conversion equations is very difficult and inconvenient.

The camera calibration may mainly comprise two steps—an internal calibration and an external calibration. The internal calibration is a procedure for calculating mechanical internal parameters of the camera itself, such as a focal distance of a lens, a distance between the lens and an image sensor, a central axis of the lens, resolution of the image sensor, etc. Also, the external calibration is a procedure for calculating external parameters related to geometrical relations between the camera and an external space, such as an installation height of the camera, angles of pan and tilt, etc.

Figure 2:
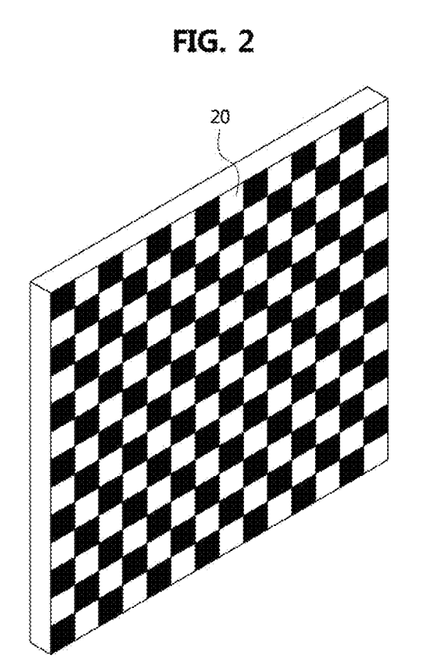
FIG. 2 illustrates an example of a board panel utilized for a camera calibration procedure of an image recognition apparatus.

FIG. 2 illustrates an example of a board panel utilized for a camera calibration procedure of an image recognition apparatus. Referring to FIG. 2, in the internal calibration procedure, multiple images on a board panel 20 having a form of chessboard size of which is already known are obtained, and parameter are calculated from the obtained multiple images.

Figure 3:
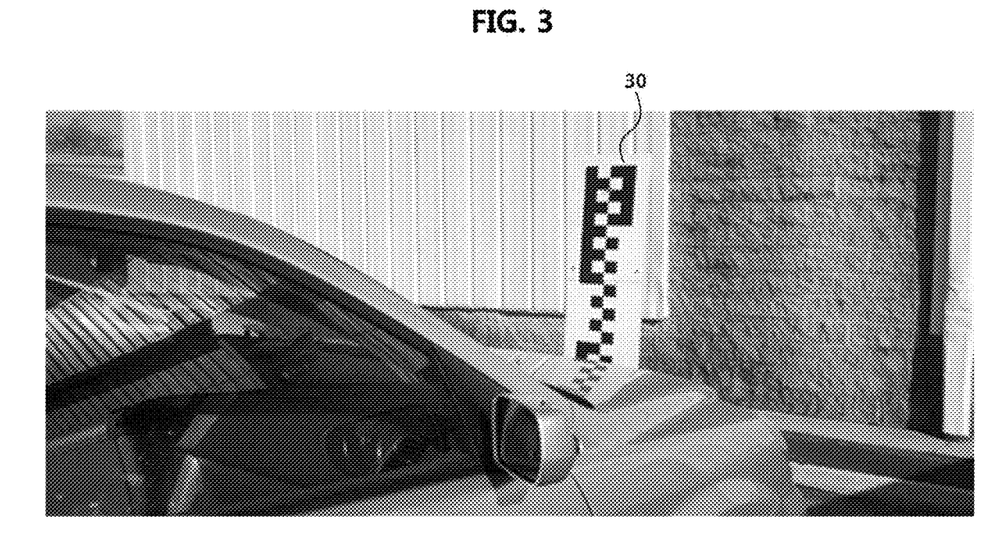
FIG. 3 is a conceptual diagram to explain a camera calibration procedure performed on the spot.

FIG. 3 is a conceptual diagram to explain a camera calibration procedure performed on the spot. Referring to FIG. 3, in the external calibration procedure, the camera is equipped in a car, etc. and the calibration is performed by using a tool 30 comprising a separately-manufactured instrument.

As described above, for the conventional image recognition apparatus, the separate calibration tool 30 should be designed for each specific case, and the calibration tool 30 having a heavy weight and a big volume should be moved in a position where a target camera is installed.

Also, since an installation height of the camera and a distance between the camera and the calibration tool 30 should be inputted on the spot, there are problems that a basic knowledge of the calibration procedure and much time are necessary and it is difficult to be performed in real time.

SUMMARY

Accordingly, example embodiments of the present invention are provided to substantially obviate one or more problems due to limitations and disadvantages of the related art.

Example embodiments of the present invention provide an image recognition apparatus which can easily configure effective regions in order to efficiently detect subject object in a target image.

Example embodiments of the present invention also provide an image recognition method which can easily configure effective regions in order to efficiently detect subject object in a target image.

In some example embodiments, an image recognition apparatus may comprise an image inputting part receiving at least one image; an effective candidate region configuring part configured to receive a user input including information on reference positions of effective candidate regions and an upper limit and a lower limit of the effective candidate regions, and to configure the effective candidate regions based on the user input; and an effective region determining part configured to select an effective region meeting a preconfigured threshold among the effective candidate regions configured based on the user input.

Here, the image inputting part may receive the at least one image including at least one subject object each of which has a different distance from a camera.

Here, the at least one image may include at least one of a visible light camera image, a thermal infrared camera image, an infrared camera image, a three-dimensional depth map image, and a two-dimensionally visualized image.

Here, the effective candidate region configuring part may display the at least one image for a user, and receive the user input including at least one of shapes such as points, line segments, and region blocks using the displayed at least one image.

Here, the user input may include information on a line data type including a reference position line of the effective candidate regions, an upper limit line of the effective candidate regions, and a lower limit line of the effective candidate regions Here, the user input may include information on a reference position line, at least two upper limit points representing the upper limit of the effective candidate regions and at least two lower limit points representing the lower limit of the effective candidate regions.

Also, the effective candidate region configuring part may generate an upper limit line by interpolating the at least two upper limit points, and generate a lower limit line by interpolating the at least two lower limit points on basis of coordinates of the reference position line.

Here, the user input may include a plurality of pairs of line segments including information on the reference positions, the upper limit and the lower limit of the effective candidate regions.

Here, each of the plurality of pairs of line segments may include a first line segment representing the upper limit of the effective candidate regions and a second line segment representing the lower limit of the effective candidate regions, and the first line segment is longer than the second line segment, and the reference positions of the effective candidate regions are determined based on lower end points of the first line segment and the second line segment.

Here, the effective region determining part may select, as the effective region, at least one subject object located between the upper limit of the effective candidate regions and the lower limit of the effective candidate regions with reference to a corresponding position of the reference positions.

Here, the at least one image may be acquired from a camera installed at a fixed position from a ground.

In other example embodiments, an image recognition method may comprise receiving at least one image including a plurality of subject objects each of which has a different distance from a camera; configuring effective candidate regions based on a user input including information on reference positions of effective candidate regions and an upper limit and a lower limit of the effective candidate regions; and selecting an effective region meeting a preconfigured threshold among the effective candidate regions.

Here, the at least one image may include at least one of a visible light camera image, a thermal infrared camera image, an infrared camera image, a three-dimensional depth map image, and a two-dimensionally visualized image.

Here, in the configuring the effective candidate regions, the at least one image may be displayed for a user, and the user input including at least one of shapes such as points, line segments, and region blocks may be received using the displayed at least one image.

Here, the user input may include information on a line data type including a reference position line of the effective candidate regions, an upper limit line of the effective candidate regions, and a lower limit line of the effective candidate regions.

Here, the user input may include information on a reference position line, at least two upper limit points representing the upper limit of the effective candidate regions and at least two lower limit points representing the lower limit of the effective candidate regions.

Also, in the configuring the effective candidate regions, on the basis of coordinates of the reference position line, an upper limit line may be generated by interpolating the at least two upper limit points, and a lower limit line may be generated by interpolating the at least two lower limit points.

Here, the user input may include a plurality of pairs of line segments including information on the reference positions, the upper limit and the lower limit of the effective candidate regions.

Also, each of the plurality of pairs of line segments may include a first line segment representing the upper limit of the effective candidate regions and a second line segment representing the lower limit of the effective candidate regions, and the first line segment is longer than the second line segment, and the reference positions of the effective candidate regions are determined based on lower end points of the first line segment and the second line segment.

Here, in the selecting the effective region, at least one subject object, which is located between the upper limit of the effective candidate regions and the lower limit of the effective candidate regions with reference to a corresponding position of the reference positions, may be selected as the effective region.

The above-described image recognition apparatus and method according to the present invention may configure effective candidate regions based on reference positions so that subject objects can be efficiently detected within a target image.

Also, according to the present invention, since a complex conventional camera calibration procedure is not necessary, time and cost can be saved. Also, necessary configuration can be performed on the spot immediately after installing a camera, and effective candidate regions can be easily re-configured even when a position of the camera changes.

Also, the image recognition apparatus and method according to the present invention can minimize a time required for image processing and a false detection probability so that image recognition performance can be enhanced remarkably.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferable example embodiments according to the present invention will be explained in detail by referring to accompanying figures.

Figure 4:
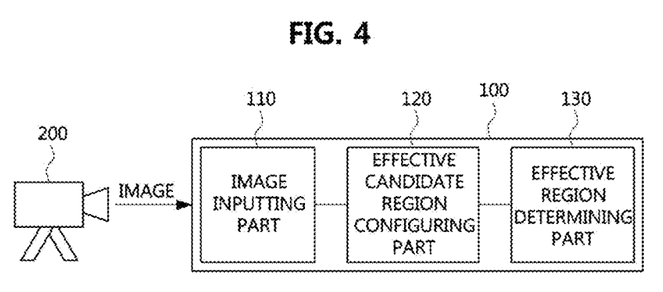
FIG. 4 is a block diagram to explain configuration of an image recognition apparatus according to the present invention.

FIG. 4 is a block diagram to explain configuration of an image recognition apparatus according to the present invention.

Referring to FIG. 4, the image recognition apparatus 100 according to the present invention may comprise an image inputting part 110, an effective candidate region configuring part 120, and an effective region determining part 130.

The image inputting part 110 may receive at least one image acquired by a camera 200. Here, the at least one image may be at least one still image, a live video, or a recorded video.

Specifically, the image inputting part 110 may receive at least one image including a plurality of subject objects from the camera 200. Here, the camera 200 may be installed in a fixed height from the ground and may acquire at least one image including a plurality of subject objects having different distances from the camera 200.

For example, the camera 200 may be a fixed CCTV camera or a camera which is fixedly attached to a moving apparatus such as a car, a robot, etc.

Also, a thermal infrared camera image, an infrared camera image, a three-dimensional depth map image such as velodyne sensor data, a two-dimensionally visualized image such as a radar image, etc. may be used as the at least one image, and they may be used selectively according to characteristics of the subject objects.

The effective candidate region configuring part 120 may receive a user input including information on a reference position line for configuring effective candidate regions and information on upper limit and lower limit of effective candidate regions, and configure effective candidate regions according to the information.

Here, the effective candidate regions may mean regions having high probability of detecting subject objects, and they may be configured according to the above user input.

Especially, the effective candidate region configuring part 120 may display the at least one image for the user, receive the user input made based on the displayed at least one image which includes at least one of shapes such as points, line segments, region blocks, etc., and configure the effective candidate regions according to the user input.

The effective region determining part 130 may select effective regions meeting a preconfigured threshold among effective candidate regions configured based on the user input. Specifically, the effective region determining part 130 may determine effective regions based on the user input including information on reference positions of effective candidate regions, upper limit and lower limit of effective region size. That is, the effective region determining part 130 may select effective regions meeting the preconfigured threshold among effective candidate regions configured by the effective candidate region configuring part 120.

For example, the effective region determining part 130 may select at least one subject object having a size falling within a range defined by the upper limit and the lower limit with reference to the corresponding reference position in the effective candidate region as effective regions.

The respective components of the image recognition apparatus 100 according to example embodiments of the present invention are separately listed for convenience of description. At least two of the components may be combined into one component, or one component may be divided into a plurality of components to perform a function. Example embodiments in which the components are combined or divided are also included in the scope of the present invention as long as the embodiments do not deviate from the spirit of the present invention.

Also, the image recognition apparatus 100 according to example embodiments of the present invention can be embodied as computer readable program or codes on a computer readable recoding medium. The computer readable recording medium is any data storage device that can store data which can be thereafter read by a computer system. Also, the computer readable recording medium can also be distributed over network coupled computer systems so that the computer readable code is stored and executed in a distributed fashion.

Figure 5:
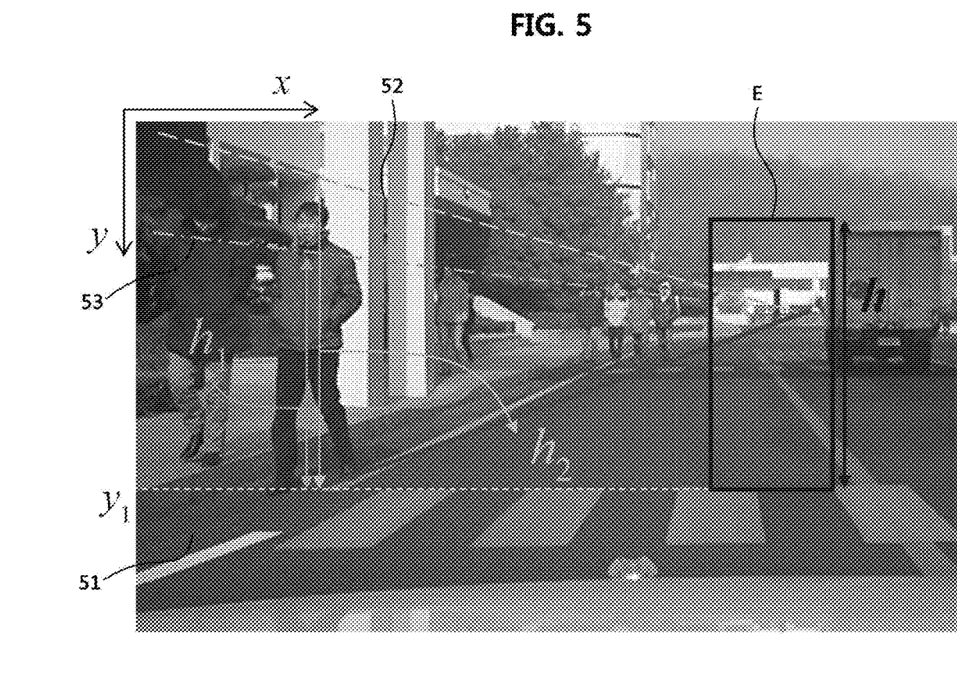
FIG. 5 is a conceptual diagram to explain an effective candidate region configuration procedure according to the present invention.

FIG. 5 is a conceptual diagram to explain an effective candidate region configuration procedure according to the present invention.

Referring to FIG. 5, according to the present invention, effective candidate regions may be configured by using the user input having a form of line data including a reference position line, an upper limit line of effective candidate regions, and a lower limit line of effective candidate regions.

The reference position line may represent reference positions of effective candidate regions. Here, reference positions of effective candidate regions may mean positions being references of effective candidate regions within which subject objects can exist.

That is, as shown in FIG. 5, in the image coordinate system, a left-top position of the image may be defined as an origin point (0,0). Also, the right direction may be defined as x-axis increasing direction and the downward direction may be defined as y-axis increasing direction. Therefore, in this image coordinate system, a reference position line of effective candidate regions may be a line 51.

For example, in an application for recognition of pedestrians walking along a street, y-coordinates of reference positions in the image may linearly decrease proportionally to a distance from the camera 200.

Also, a size of effective candidate regions may mean a size in the image to which unique size information of subject objects (e.g. a normal pedestrian has a height from 0.5 m to 2.5 m) is reflected. Meanwhile, since the same subject object may have different sizes in the image according to its distance from the camera 200, the size of effective candidate region may vary according to the reference position corresponding to each effective candidate region.

In this case, if the reference position line of the effective candidate regions is set to the line 51 as described above, the size of effective candidate regions may become larger as y-coordinate increases (i.e. for objects located at lower part of the image), and become smaller as y-coordinate decreases (i.e. for objects located at upper part of the image).

Also, the size of effective candidate regions may be defined using a range comprising an upper limit and a lower limit in consideration of unique size differences of subject objects (e.g. differences between heights of children and adults), height differences of undulating ground, height differences between a sidewalk and a roadway, etc.

On the other hand, the effective candidate regions may be configured by referring to at least one still image, a live video, or a recorded video. Also, the user input may be displayed as overlaid image on the at least one still image, the live video, or the recorded video.

Referring to FIG. 5, a method for configuring reference position of effective candidate regions and a range of effective candidate region size by using three lines is explained as follows.

Three lines shown on the image may be inputted by the user. One of the three lines may represent reference positions of effective candidate regions, and other two lines may represent an upper limit and a lower limit for effective candidate regions. Here, the line representing the reference positions of effective candidate regions may be referred to as the reference position line 51. The line representing the upper limit of effective candidate regions may be referred to as an upper limit line 52, and the line representing the lower limit of effective candidate regions may be referred to as a lower limit line 53.

In FIG. 5, the undermost line means the reference position line 51 of effective candidate regions, and the middle line means the lower limit line 53, and the uppermost line means the upper limit line 52.

Here, information on the lines may be inputted with general line information, point data or numeric data (coordinates of points) for determining the lines. Thus, all input forms which can determine the lines can be used. That is, the reference position line 51, the upper limit line 52, and the lower limit line 53 mean conceptual lines, and methods for inputting information on the lines may be various.

Also, each of the lines may be a curved line as well as a straight line. For example, a straight line may be used when objects moving on a flat ground are to be detected, and a curved line may be used when objects moving on the ground having upward and downward changes of height are to be detected.

Furthermore, even for the flat ground, in case that a straight line cannot efficiently represent distances between subject objects and the camera 200 (e.g. in case of an image including a curved street), a curved line may be used as the reference position line 51.

Specifically, as methods for inputting curved lines, several major points defining a target curved line are selected, and the curved line can be approximated as a Bézier curve or a spline curve connecting the major points.

Here, a method of directly drawing a line or inputting two points determining a line may be used as a method for inputting information on the lines.

For a method for discrimination the reference position line, the upper limit line, and the lower limit line among three inputted lines, a method in which the user directly indicates a type of inputted line and a method of automatically discrimination a type of inputted line are possible.

In the method of automatically identifying types of inputted lines, through inspection on positional relations of the three lines, the undermost line may be identified as the reference position line 51, and the uppermost line may be identified as the upper limit line 52, and the middle line may be identified as the lower limit line 53.

Since the above-described identification of line types based on positional relations of the three lines cannot be always possible, identification method may be different according to target subject objects. For example, when subject objects are objects moving as attached on a roof or moving as hanged on a string, the uppermost line may be the reference position line, and the undermost line may be the upper limit line, and the middle line may be the lower limit line.

Meanwhile, in case that up/down positional relations between the inputted lines are automatically identified, when the inputted lines intersect each other in the image, the positional relations may be not clearly identified. In this case, the up/down positional relations between the lines may be identified by using a method of comparing area sizes divided by each line. That is, since a line divides the image into an upward part and a downward part, the line is identified as a line positioned downward (or, upward) as compared to other lines as the size of downward part determined by the line is larger (or, smaller) than the size of upward part determined by the line.

If all of the reference position line 51, the upper limit line 52, and the lower limit line 53 are determined, the upper limit of effective candidate regions for each reference position may be determined as a vertical distance between the reference position line 51 and the upper limit line 52 at the corresponding reference position. Also, the lower limit of effective candidate regions for each reference position may be determined as a vertical distance between the reference position line 51 and the lower limit line 53 at the corresponding reference position.

That is, in FIG. 5, at the reference position $y_1$, the upper limit of effective candidate regions may be $h_2$ and the lower limit of effective candidate regions may be $h_1$.

If the effective candidate region configuration is completed as described above, it is very simple to determine whether a specific candidate region is valid or not. For example, in FIG. 5, since a height h of a rectangular region E falls within a range defined by $h_1$ and $h_2$ at the reference position $y_1$ (i.e. $h_1 < h < h_2$), the rectangular region E may be selected as an effective candidate region.

Figure 6:
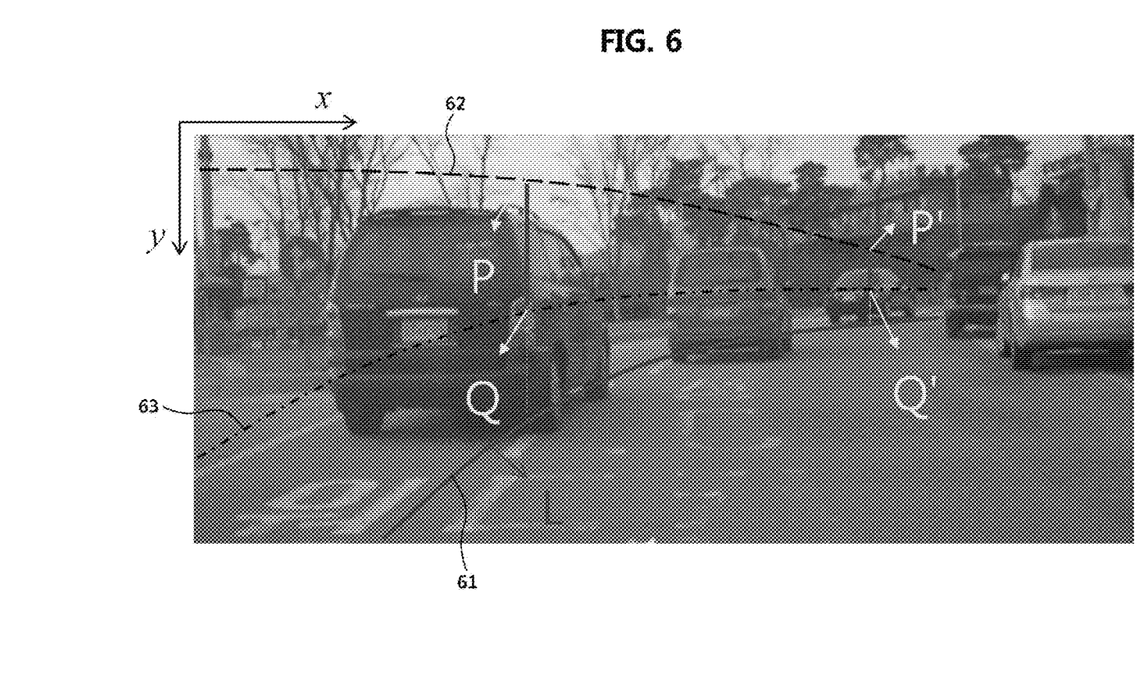
FIG. 6 is a conceptual diagram to explain a method of configuring effective candidate regions according to an example embodiment of the present invention.

FIG. 6 is a conceptual diagram to explain a method of configuring effective candidate regions according to an example embodiment of the present invention.

Referring to FIG. 6, effective candidate regions may be configured by using a single reference position line 61 represented as L, at least two upper limit points (P and P') representing information on the upper limit of effective candidate regions, at least two lower limit points (Q and Q') representing information on the lower limit of effective candidate regions.

That is, the effective candidate region configuring part 120 may generate an upper limit line 62 through an interpolation using the at least two upper limit points (P and P'), and generate an effective region lower limit line 63 through an interpolation using the at least two lower limit points (Q and Q'), with reference to y-coordinates on the reference position line 61.

In FIG. 6, P-Q and P'-Q' may be pairs of reference points representing sizes of effective candidate regions. Although two pairs of reference points which represent sizes of effective candidate regions are shown in FIG. 6, more than three pairs of reference points may also be used according to characteristics of subject objects.

Similarly to the example embodiment explained through FIG. 5, the reference position line 61 may be a curved line as well as a straight line. In FIG. 6, an example in which the reference position line 61 has a form of a curved line is illustrated.

Also, a method for inputting the reference position line 61 may include various input methods for determining the line, such as a method of directly drawing the line on the image, a method of indicating points through the line passes, and a method of directly inputting coordinates of points through the line passes, etc.

A pair of reference points may comprise an upper limit point representing information on an upper limit of effective candidate regions and a lower limit point representing information on a lower limit of effective candidate regions.

In order for the user to input the pair of reference points, various methods such as a method of indicating two points in the image, a method of inputting image coordinates of two points, and a method of drawing a line segment connecting two points, etc. may be used.

In FIG. 6, an example in which line segments such as a line segment PQ and a line segment P'Q' are inputted is illustrated.

For discriminating an upper limit point and a lower limit point among two points constituting a reference point pair, although a user can directly input the discrimination, it is preferred in aspect of user convenience to discriminate an upper point as the upper limit point and a lower point as the lower limit point by checking their up/down positional relation in the image.

However, according to characteristics of subject objects (for example, subject objects hanging upside down), the discrimination may become inverse. Thus, a method in which an upper limit point and a lower limit point can be discriminated regardless of the characteristics of the subject objects may be a method in which a point located relatively close to the reference position line 61 is regarded as the upper limit point and a point located relatively far from the reference point line 61 is regarded as the lower limit point. In FIGS. 6, P and P' may be upper limit points, and Q and Q' may be lower limit points.

As described above, when the upper limit points and the lower limit points are discriminated, the upper limit line 62 may be generated by connecting the upper limit points, and the lower limit line 63 may be generated by connection the lower limit points.

In FIG. 6, the upper limit line 62 may be generated by connecting P and P', and the lower limit line 63 may be generated by connecting Q and Q'. Also, it may be possible to provide the generated upper limit line 62 and lower limit line 63 to the user and to receive feedbacks on them from the user.

Also, in order to connect the upper limit points and to connect the lower limit points, they may be connected as a straight line when the reference position line 61 is a straight line. Otherwise, when the reference position line 61 is a curved line, the upper limit line 62 may be generated by interpolating the upper limit points, and the lower limit line 63 may be generated by interpolating the lower limit points.

For example, a method for generating the upper limit line 62 by interpolating the upper limit points may be as follows.

It is assumed that image coordinates of two upper limit points are $P(a_1, b_1)$ and $P'(a_2, b_2)$, and a y-coordinate of the reference position line at $x=a_1$ is $y_1$, and a y-coordinate of the reference position line at $x=a_2$ is $y_2$.

Then, the upper limit $h_1$ may become $|y_1-b_1|$ at $y=y_1$, and the lower limit $h_2$ may become $|y_2-b_2|$ at $y=y_2$. Thus, the two values are interpolated so that the upper limit at an arbitrary reference position y may be represented as the following equation 1.

$$h(y)=h2+(h1-h2)\times(y-y2)/(y1-y2) \quad \text{[Equation 1]}$$

It is sufficient for an internal purpose of determining effective candidate regions to derive the upper limit by applying the equation 1. However, in a case that the upper limit line 62 should be displayed on the image for user's verification, a line located at h(y) apart from the reference position line 61 may be generated as the upper limit line 62. That is, a line constituted with points having y-coordinates generated by subtracting h(y) from y-coordinates of points on the reference position line 61 can be the upper limit line 62.

Similarly, the lower limit line 63 may be generated by interpolating lower limit points.

Figure 7:
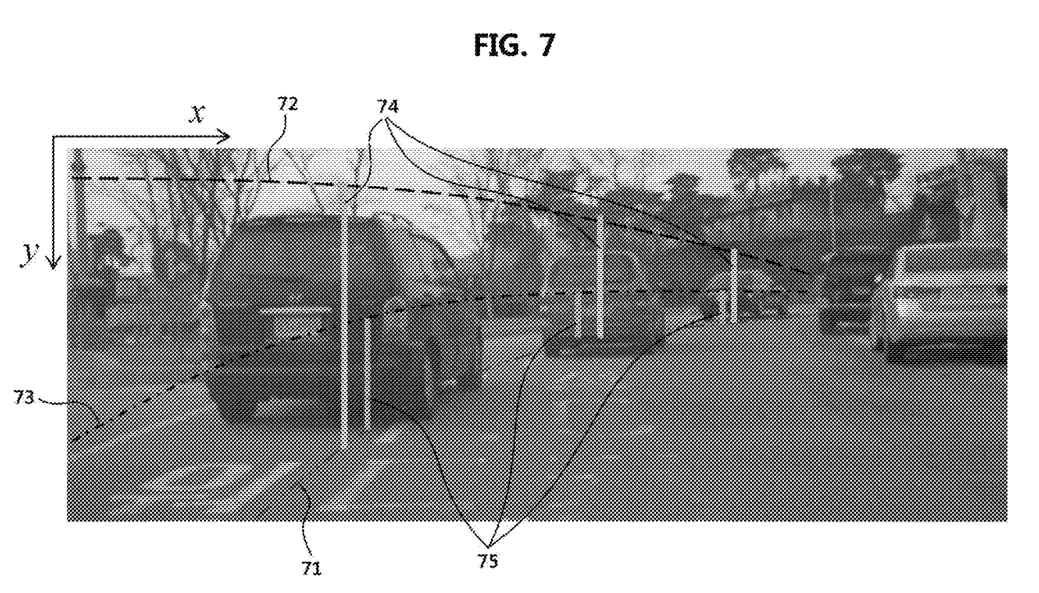
FIG. 7 is a conceptual diagram to explain a method of configuring effective candidate regions according to another example embodiment of the present invention.

FIG. 7 is a conceptual diagram to explain a method of configuring effective candidate regions according to another example embodiment of the present invention.

Referring to FIG. 7, effective candidate regions may be configured based on a user input including a plurality of pairs of line segments comprising information on reference positions of effective candidate regions, and upper limit and lower limit of the effective candidate regions.

Here, each of the plurality of pairs of line segments may comprise a first line segment 74 representing information on an upper limit of effective candidate regions and a second line segment 75 representing information on a lower limit of effective candidate regions. That is, the first line segment 74 may be longer than the second line segment 75.

Also, a reference position line 71 may be generated based on downward end points of the first line segments 74 and the second line segments 75.

Here, methods for inputting line segments may include a method of directly drawing line segments on the image, a method of indicating two end points determining a line segment, a method of inputting coordinates of two end points of a line segment, etc. The inputted line segments may be displayed on the image for user's verification according to applications.

In order to configure effective candidate regions by using the inputted line segments, reference positions may be generated by interpolating lower end points of the inputted line segments, and the effective candidate regions may be configured by setting size limits of effective candidate regions at a corresponding reference position based on lengths of the inputted line segments.

In FIG. 7, an example in which the line segments are utilized for configuring upper limit and lower limit of effective candidate regions is illustrated. Here, a first line segment 74 is a line segment for configuring the upper limit line 72, and a second line segment 75 is a line segment for configuring the lower limit line 73.

The first line segments 74 and the send line segments 75 may be indicated by the user as discriminated, or by automatically discriminated. In order to automatically discriminate the first line segments 74 and the second line segments 75, if the first line segments 74 and the second line segments 75 are inputted in sequence as paired, a longer line segment among the inputted pair of line segments may be discriminated as the first line segment 74, and a shorter line segment may be discriminated as the second line segment 75.

Although an example in which three pairs of line segments are used for configuring effective candidate regions is illustrated in FIG. 7, since the minimum number of pairs needed for configuring effective candidate regions is 2, more than two pairs of line segments (e.g. 2 or 4 pairs) may be used for configuring effective candidate regions.

Figure 8:
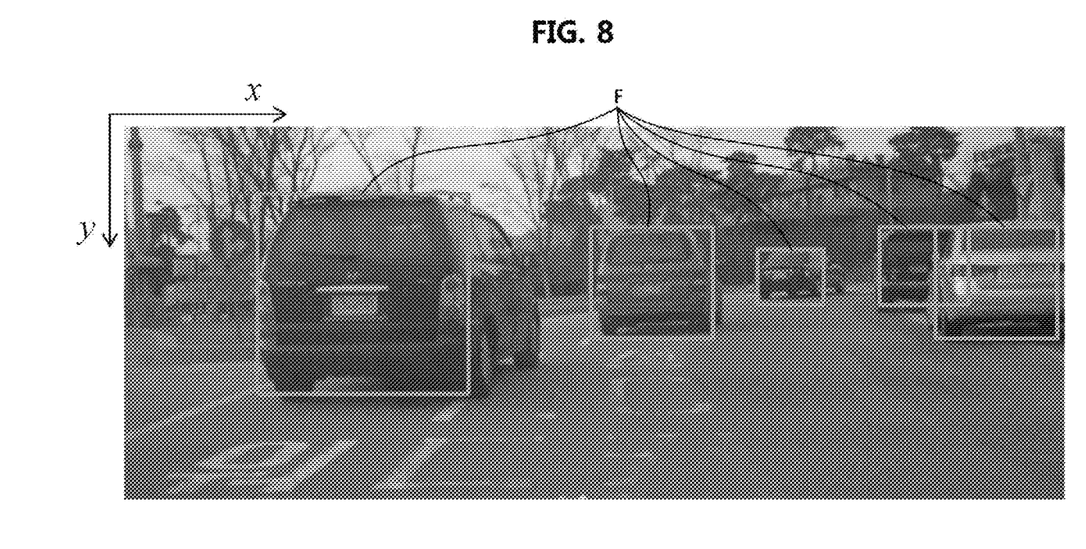
FIG. 8 is a conceptual diagram to explain a method of configuring effective candidate regions according to other example embodiment of the present invention.

FIG. 8 is a conceptual diagram to explain a method of configuring effective candidate regions according to other example embodiment of the present invention.

Referring to FIG. 8, effective candidate regions may be configured by inputting at least one region block F having a position and a size (height) corresponding to a position and a size (height) of an actual object.

In FIG. 8, the region block F having a rectangular shape is used for configuring effective candidate regions. However, the region block F may have various shapes such as a triangle shape, a rhombus shape, and an ellipse shape.

In order to configure effective candidate regions by using the region block F, a central point of a lower boundary of the inputted region block F is determined to be a reference position. When a size of the region block is assumed to be h, (h+d) may be configured as an upper limit of effective candidate regions, and (h−d) may be configured as a lower limit of effective candidate regions. Here, d may be a predefined constant value or a constant value determined proportionally to h. For example, d may be configured as d=0.5×h. Also, d may be controller by the user.

As described above, for each inputted region block, a size range of effective candidate regions at a corresponding reference position may be calculated. The size range of effective candidate regions at an arbitrary reference position may be calculated by interpolating the size ranges of effective candidate regions determined on the basis of the inputted region blocks.

Figure 9:
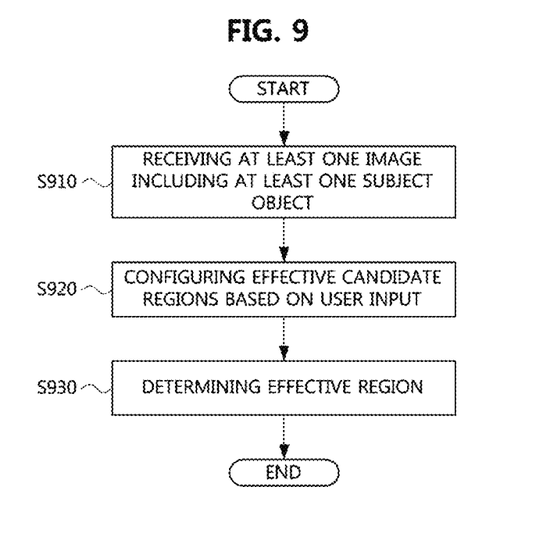
FIG. 9 is a flow chart to explain an image recognition method according to the present invention.

FIG. 9 is a flow chart to explain an image recognition method according to the present invention.

Referring to FIG. 9, the image recognition method according to the present invention may comprise a step S910 of receiving at least one image including at least one subject object, a step S920 of receiving user input and configuring effective candidate regions, and a step S930 of determining effective regions based on the user input.

In the step S910, at least one image including at least one subject object having different distances from the camera 200 may be received.

Here, the at least one image may include at least one of a visible light camera image, a thermal infrared camera image, an infrared camera image, a three-dimensional depth map image, and a two-dimensionally visualized image.

In the step S920, effective candidate regions may be configured by receiving the user input including information on a reference position line for configuring effective candidate regions and information on upper limit and lower limit of effective candidate regions, and configure effective candidate regions according to the information.

Here, the at least one image may be displayed for the user, and the user may input the user input including at least one of shapes such as points, line segments, region blocks, etc.

Specifically, the user input may include information, having a form of line data, about a reference position line, an upper limit line of effective candidate regions, and a lower limit line of effective candidate regions.

Also, the user input may include information on at least two upper limit points representing the upper limit line and at least two lower limit points representing the lower limit line. In this case, the upper limit line may be generated by interpolating the at least two upper limit points with reference to corresponding coordinates on the reference position line, and the lower limit line may be generated by interpolating the at least two lower limit points with reference to corresponding coordinates on the reference position line.

Also, the user input may include a plurality of pairs of line segments including information reference positions of effective candidate regions, upper limit and lower limit of effective candidate regions. Here, each of the plurality of pairs of line segments may comprise a first line segment including information on the upper limit line and a second line segment including information on the lower limit line. For each of the pairs, the first line segment may be longer that the second line segment, and the reference positions of effective candidate regions may be determined based on lower end points of the first and second line segments.

In the step S930, at least one subject object located between the upper limit line and the lower limit line with reference to the corresponding reference position may be selected as an effective region.

The above-described image recognition apparatus and method according to the present invention may configure effective candidate regions based on reference positions so that subject objects can be efficiently detected within a target image.

Also, according to the present invention, since a complex conventional camera calibration procedure is not necessary, time and cost can be saved. Also, necessary configuration can be performed on the spot immediately after installing a camera, and effective candidate regions can be easily reconfigured even when a position of the camera changes.

Also, the image recognition apparatus and method according to the present invention can minimize a time required for image processing and a false detection probability so that image recognition performance can be enhanced remarkably.

While the example embodiments of the present invention and their advantages have been described in detail, it should be understood that various changes, substitutions and alterations may be made herein without departing from the scope of the invention.

What is claimed is:

1. An image recognition apparatus comprising:
an image inputting part receiving at least one image;
an effective candidate region configuring part configured to receive a user input including information on reference positions of effective candidate regions in the at least one image and an upper limit and a lower limit of the effective candidate regions in the at least one image, and to configure the effective candidate regions based on the user input; and
an effective region determining part configured to determine whether a specific candidate region is an effective region meeting a preconfigured threshold among the effective candidate regions configured based on the user input and recognize a subject object only falling within the effective region.

2. The apparatus of the claim 1, wherein the image inputting part receives the at least one image including at least one subject object each of which has a different distance from a camera.

3. The apparatus of the claim 1, wherein the at least one image includes at least one of a visible light camera image, a thermal infrared camera image, an infrared camera image, a three-dimensional depth map image, and a two-dimensionally visualized image.

4. The apparatus of the claim 1, wherein the effective candidate region configuring part displays the at least one image for a user, and receives the user input including at least one of shapes such as points, line segments, and region blocks using the displayed at least one image.

5. The apparatus of the claim 1, wherein the user input includes information on a line data type including a reference position line of the effective candidate regions, an upper limit line of the effective candidate regions, and a lower limit line of the effective candidate regions,
wherein the upper limit is a vertical distance between the reference position line and the upper limit line and the lower limit is a vertical distance between the reference position line and the lower limit line, and
wherein the effective region determining part determines the effective region by determining a height of the specific candidate region falls within a range defined by the upper limit and the lower limit.

6. The apparatus of the claim 1, wherein the user input includes information on a reference position line, at least two upper limit points representing the upper limit of the effective candidate regions and at least two lower limit points representing the lower limit of the effective candidate regions.

7. The apparatus of the claim 6, wherein the effective candidate region configuring part generates an upper limit line by interpolating the at least two upper limit points, and generates a lower limit line by interpolating the at least two lower limit points on the basis of coordinates of the reference position line,
wherein the upper limit is a vertical distance between the reference position line and the upper limit line and the lower limit is a vertical distance between the reference position line and the lower limit line, and
wherein the effective region determining part determines the effective region by determining a height of the specific candidate region falls within a range defined by the upper limit and the lower limit.

8. The apparatus of the claim 1, wherein the user input includes a plurality of pairs of line segments including information on the reference positions, the upper limit and the lower limit of the effective candidate regions.

9. The apparatus of the claim 8,
wherein each of the plurality of pairs of line segments includes a first line segment representing the upper limit of the effective candidate regions and a second line segment representing the lower limit of the effective candidate regions,
wherein the first line segment is longer than the second line segment, and the reference positions of the effective candidate regions are determined based on lower end points of the first line segment and the second line segment,
wherein the effective candidate region configuring part generates a reference position line based on downward end points of the first line segments and the second line segments, generates an upper limit line based on the first line segments, and generates a lower limit line based on the second line segments,
wherein the upper limit is a vertical distance between the reference position line and the upper limit line and the lower limit is a vertical distance between the reference position line and the lower limit line, and
wherein the effective region determining part determines the effective region by determining a height of the specific candidate region falls within a range defined by the upper limit and the lower limit.

10. The apparatus of the claim 1, wherein the effective region determining part determines, as the effective region, at least one subject object located between the upper limit of the effective candidate regions and the lower limit of the effective candidate regions with reference to a corresponding position of the reference positions.

11. The apparatus of the claim 1, wherein the at least one image is acquired from a camera installed at a fixed position from a ground.

12. An image recognition method comprising:
receiving at least one image including a plurality of subject objects each of which has a different distance from a camera;
configuring effective candidate regions based on a user input including information on reference positions of the effective candidate regions in the at least on image and an upper limit and a lower limit of the effective candidate regions in the at least on image;
determining whether a specific candidate region is an effective region meeting a preconfigured threshold among the effective candidate regions; and
recognizing a subject object only falling within the effective region.

13. The method of the claim 12, wherein the at least one image includes at least one of a visible light camera image, a thermal infrared camera image, an infrared camera image, a three-dimensional depth map image, and a two-dimensionally visualized image.

14. The method of the claim 12, wherein, in the configuring the effective candidate regions, the at least one image is displayed for a user, and the user input including at least one of shapes such as points, line segments, and region blocks is received using the displayed at least one image.

15. The method of the claim 12, wherein the user input includes information on a line data type including a reference position line of the effective candidate regions, an upper limit line of the effective candidate regions, and a lower limit line of the effective candidate regions,
- wherein the upper limit is a vertical distance between the reference position line and the upper limit line and the lower limit is a vertical distance between the reference position line and the lower limit line, and
- wherein in the determining the effective region, a height of the specific candidate region is determined to fall within a range defined by the upper limit and the lower limit.

16. The method of the claim 12, wherein the user input includes information on a reference position line, at least two upper limit points representing the upper limit of the effective candidate regions and at least two lower limit points representing the lower limit of the effective candidate regions.

17. The method of the claim 16, wherein, in the configuring the effective candidate regions, on the basis of coordinates of the reference position line, an upper limit line is generated by interpolating the at least two upper limit points, and a lower limit line is generated by interpolating the at least two lower limit points,
- wherein the upper limit is a vertical distance between the reference position line and the upper limit line and the lower limit is a vertical distance between the reference position line and the lower limit line, and
- wherein in the determining the effective region, a height of the specific candidate region is determined to fall within a range defined by the upper limit and the lower limit.

18. The method of the claim 12, wherein the user input includes a plurality of pairs of line segments including information on the reference positions, the upper limit and the lower limit of the effective candidate regions.

19. The method of the claim 18,
- wherein each of the plurality of pairs of line segments includes a first line segment representing the upper limit of the effective candidate regions and a second line segment representing the lower limit of the effective candidate regions,
- wherein the first line segment is longer than the second line segment, and the reference positions of the effective candidate regions are determined based on lower end points of the first line segment and the second line segment,
- wherein a reference position line is generated based on downward end points of the first line segments and the second line segments, an upper limit line is generated based on the first line segments, and a lower limit line is generated based on the second line segments,
- wherein the upper limit is a vertical distance between the reference position line and the upper limit line and the lower limit is a vertical distance between the reference position line and the lower limit line, and
- wherein in the determining the effective region, a height of the specific candidate region is determined to fall within a range defined by the upper limit and the lower limit.

20. The method of the claim 12, wherein, in the determining the effective region, at least one subject object, which is located between the upper limit of the effective candidate regions and the lower limit of the effective candidate regions with reference to a corresponding position of the reference positions, is determined as the effective region.

* * * * *